United States Patent
Geda et al.

(10) Patent No.: US 9,649,007 B2
(45) Date of Patent: May 16, 2017

(54) ROTATING FILTER FOR A DISHWASHER AND METHODS OF CLEANING A ROTATING FILTER

(71) Applicant: WHIRLPOOL CORPORATION, Benton Harbor, MI (US)

(72) Inventors: Jacquelyn R. Geda, Saint Joseph, MI (US); Antony M. Rappette, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 15/378,382

(22) Filed: Dec. 14, 2016

(65) Prior Publication Data

US 2017/0086643 A1    Mar. 30, 2017

Related U.S. Application Data

(62) Division of application No. 13/657,896, filed on Oct. 23, 2012.

(51) Int. Cl.
*A47L 15/42* (2006.01)
*B01D 24/46* (2006.01)

(52) U.S. Cl.
CPC ....... *A47L 15/4208* (2013.01); *A47L 15/4202* (2013.01); *A47L 15/4206* (2013.01); *B01D 24/46* (2013.01)

(58) Field of Classification Search
None
See application file for complete search history.

(56) References Cited

U.S. PATENT DOCUMENTS

| 1,617,021 | A | 2/1927 | Mitchell |
| 2,154,559 | A | 4/1939 | Bilde |
| 2,422,022 | A | 6/1947 | Koertge |
| 2,734,155 | A | 2/1956 | Flannery |
| 3,016,147 | A | 1/1962 | Cobb et al. |
| 3,026,628 | A | 3/1962 | Berger, Sr. et al. |
| 3,068,877 | A | 12/1962 | Jacobs |
| 3,103,227 | A | 9/1963 | Long |
| 3,122,148 | A | 2/1964 | Alabaster |
| 3,186,417 | A | 6/1965 | Fay |
| 3,288,154 | A | 11/1966 | Jacobs |
| 3,378,933 | A | 4/1968 | Jenkins |

(Continued)

FOREIGN PATENT DOCUMENTS

| CH | 169630 | 6/1934 |
| CN | 2571812 | 9/2003 |

(Continued)

OTHER PUBLICATIONS

Ishihara et al., JP 11155792 A, English Machine Translation, 1999. pp. 1-14.

(Continued)

*Primary Examiner* — Michael Kornakov
*Assistant Examiner* — Ryan Coleman
(74) *Attorney, Agent, or Firm* — McGarry Bair PC

(57) ABSTRACT

A dishwasher with a tub at least partially defining a washing chamber, a liquid spraying system, a liquid recirculation circuit, and a liquid filtering system where the liquid filtering system includes a rotating filter and where a granular agent contacts the rotating filter to clean the filter. Methods of cleaning a rotating filter provided within a liquid flow by scouring the filter with a granular agent.

34 Claims, 10 Drawing Sheets

(56) References Cited

U.S. PATENT DOCUMENTS

| | | |
|---|---|---|
| 3,542,594 A | 11/1970 | Smith et al. |
| 3,575,185 A | 4/1971 | Barbulesco |
| 3,586,011 A | 6/1971 | Mazza |
| 3,739,145 A | 6/1973 | Woehler |
| 3,801,280 A | 4/1974 | Shah et al. |
| 3,846,321 A | 11/1974 | Strange |
| 3,906,967 A | 9/1975 | Bergeson |
| 3,989,054 A | 11/1976 | Mercer |
| 4,179,307 A | 12/1979 | Cau et al. |
| 4,180,095 A | 12/1979 | Woolley et al. |
| 4,228,962 A | 10/1980 | Dingler et al. |
| 4,326,552 A | 4/1982 | Bleckmann |
| 4,374,443 A | 2/1983 | Mosell |
| 4,528,097 A | 7/1985 | Ward |
| 4,754,770 A | 7/1988 | Fornasari |
| 5,002,890 A | 3/1991 | Morrison |
| 5,030,357 A | 7/1991 | Lowe |
| 5,133,863 A | 7/1992 | Zander |
| 5,331,986 A | 7/1994 | Lim et al. |
| 5,454,298 A | 10/1995 | Lu |
| 5,470,142 A | 11/1995 | Sargeant et al. |
| 5,470,472 A | 11/1995 | Baird et al. |
| 5,557,704 A | 9/1996 | Dennis et al. |
| 5,569,383 A | 10/1996 | Vander Ark, Jr. et al. |
| 5,618,424 A | 4/1997 | Nagaoka |
| 5,630,437 A | 5/1997 | Dries et al. |
| 5,711,325 A | 1/1998 | Kloss et al. |
| 5,755,244 A | 5/1998 | Sargeant et al. |
| 5,782,112 A | 7/1998 | White et al. |
| 5,803,100 A | 9/1998 | Thies |
| 5,865,997 A | 2/1999 | Isaacs |
| 5,868,937 A | 2/1999 | Back et al. |
| 5,904,163 A | 5/1999 | Inoue et al. |
| 5,924,432 A | 7/1999 | Thies et al. |
| 6,289,908 B1 | 9/2001 | Kelsey |
| 6,389,908 B1 | 5/2002 | Chevalier et al. |
| 6,460,555 B1 | 10/2002 | Tuller et al. |
| 6,491,049 B1 | 12/2002 | Tuller et al. |
| 6,601,593 B2 | 8/2003 | Diess et al. |
| 6,666,976 B2 | 12/2003 | Benenson, Jr. et al. |
| 6,800,197 B1 | 10/2004 | Kosola et al. |
| 6,997,195 B2 | 2/2006 | Durazzani et al. |
| 7,047,986 B2 | 5/2006 | Ertle et al. |
| 7,069,181 B2 | 6/2006 | Jerg et al. |
| 7,093,604 B2 | 8/2006 | Jung et al. |
| 7,153,817 B2 | 12/2006 | Binder |
| 7,198,054 B2 | 4/2007 | Welch |
| 7,208,080 B2 | 4/2007 | Batten et al. |
| 7,232,494 B2 | 6/2007 | Rappette |
| 7,250,174 B2 | 7/2007 | Lee et al. |
| 7,270,132 B2 | 9/2007 | Inui et al. |
| 7,319,841 B2 | 1/2008 | Bateman, III et al. |
| 7,326,338 B2 | 2/2008 | Batten et al. |
| 7,347,212 B2 | 3/2008 | Rosenbauer |
| 7,350,527 B2 | 4/2008 | Gurubatham et al. |
| 7,363,093 B2 | 4/2008 | King et al. |
| 7,406,843 B2 | 8/2008 | Thies et al. |
| 7,445,013 B2 | 11/2008 | VanderRoest et al. |
| 7,497,222 B2 | 3/2009 | Edwards et al. |
| 7,523,758 B2 | 4/2009 | VanderRoest et al. |
| 7,594,513 B2 | 9/2009 | VanderRoest et al. |
| 7,819,983 B2 | 10/2010 | Kim et al. |
| 7,896,977 B2 | 3/2011 | Gillum et al. |
| 8,043,437 B1 | 10/2011 | Delgado et al. |
| 8,161,986 B2 | 4/2012 | Alessandrelli |
| 8,215,322 B2 | 7/2012 | Fountain et al. |
| 8,627,832 B2 | 1/2014 | Fountain et al. |
| 8,667,974 B2 | 3/2014 | Fountain et al. |
| 8,746,261 B2 | 6/2014 | Welch |
| 9,005,369 B2 | 4/2015 | Delgado et al. |
| 9,034,112 B2 | 5/2015 | Tuller et al. |
| 2002/0017483 A1 | 2/2002 | Chesner et al. |
| 2003/0037809 A1 | 2/2003 | Favaro |
| 2003/0168087 A1 | 9/2003 | Inui et al. |
| 2003/0205248 A1 | 11/2003 | Christman et al. |
| 2004/0007253 A1 | 1/2004 | Jung et al. |
| 2004/0103926 A1 | 6/2004 | Ha |
| 2005/0022849 A1 | 2/2005 | Park et al. |
| 2005/0133070 A1 | 6/2005 | Vanderroest et al. |
| 2006/0005863 A1 | 1/2006 | Gurubatham et al. |
| 2006/0054549 A1 | 3/2006 | Schoendorfer |
| 2006/0123563 A1 | 6/2006 | Raney et al. |
| 2006/0162744 A1 | 7/2006 | Walkden |
| 2006/0174915 A1 | 8/2006 | Hedstrom et al. |
| 2006/0236556 A1 | 10/2006 | Ferguson et al. |
| 2006/0237049 A1 | 10/2006 | Weaver et al. |
| 2007/0006898 A1 | 1/2007 | Lee |
| 2007/0107753 A1 | 5/2007 | Jerg |
| 2007/0163626 A1 | 7/2007 | Klein |
| 2007/0186964 A1 | 8/2007 | Mason et al. |
| 2007/0246078 A1 | 10/2007 | Purtilo et al. |
| 2007/0266587 A1 | 11/2007 | Bringewatt et al. |
| 2008/0116135 A1 | 5/2008 | Rieger et al. |
| 2008/0289654 A1 | 11/2008 | Kim et al. |
| 2008/0289664 A1 | 11/2008 | Rockwell et al. |
| 2009/0095330 A1 | 4/2009 | Iwanaga et al. |
| 2009/0283111 A1 | 11/2009 | Classen et al. |
| 2010/0012159 A1 | 1/2010 | Verma et al. |
| 2010/0043826 A1 | 2/2010 | Bertsch et al. |
| 2010/0043828 A1 | 2/2010 | Choi et al. |
| 2010/0043847 A1 | 2/2010 | Yoon et al. |
| 2010/0121497 A1 | 5/2010 | Heisele et al. |
| 2010/0154830 A1 | 6/2010 | Lau et al. |
| 2010/0154841 A1 | 6/2010 | Fountain et al. |
| 2010/0224223 A1 | 9/2010 | Kehl et al. |
| 2010/0252081 A1 | 10/2010 | Classen et al. |
| 2010/0300499 A1 | 12/2010 | Han et al. |
| 2011/0120508 A1 | 5/2011 | Yoon et al. |
| 2011/0126865 A1 | 6/2011 | Yoon et al. |
| 2011/0146714 A1 | 6/2011 | Fountain et al. |
| 2012/0097200 A1 | 4/2012 | Fountain |
| 2012/0138107 A1 | 6/2012 | Fountain et al. |
| 2012/0167928 A1 | 7/2012 | Fountain et al. |
| 2012/0318309 A1 | 12/2012 | Tuller et al. |

FOREIGN PATENT DOCUMENTS

| | | |
|---|---|---|
| CN | 1966129 | 5/2007 |
| CN | 2907930 | 6/2007 |
| CN | 10140639 | 4/2009 |
| CN | 201276653 | 7/2009 |
| CN | 201361486 | 12/2009 |
| CN | 101654855 | 2/2010 |
| CN | 201410325 | 2/2010 |
| CN | 201473770 | 5/2010 |
| DE | 1134489 | 8/1967 |
| DE | 1428358 A1 | 11/1968 |
| DE | 1453070 | 3/1969 |
| DE | 7105474 | 8/1971 |
| DE | 1237309 U | 9/1973 |
| DE | 2825242 A1 | 1/1979 |
| DE | 3337369 A1 | 4/1985 |
| DE | 3723721 A1 | 5/1988 |
| DE | 3842997 A1 | 7/1990 |
| DE | 4011834 A1 | 10/1991 |
| DE | 4016915 A1 | 11/1991 |
| DE | 4131914 A1 | 4/1993 |
| DE | 9415486 U1 | 11/1994 |
| DE | 9416710 U1 | 1/1995 |
| DE | 4413432 C1 | 8/1995 |
| DE | 4418523 A1 | 11/1995 |
| DE | 69111365 T2 | 3/1996 |
| DE | 19546965 A1 | 6/1997 |
| DE | 69403957 T2 | 1/1998 |
| DE | 19652235 | 6/1998 |
| DE | 10000772 A1 | 7/2000 |
| DE | 69605965 T2 | 8/2000 |
| DE | 19951838 A1 | 5/2001 |
| DE | 10065571 A1 | 7/2002 |
| DE | 10106514 A1 | 8/2002 |
| DE | 60206490 T2 | 5/2006 |
| DE | 60302143 | 8/2006 |
| DE | 102005023428 A1 | 11/2006 |
| DE | 102005038433 A1 | 2/2007 |

(56) References Cited

FOREIGN PATENT DOCUMENTS

| | | |
|---|---|---|
| DE | 102007007133 A1 | 8/2008 |
| DE | 102007060195 A1 | 6/2009 |
| DE | 202010006739 U1 | 8/2010 |
| DE | 102009027910 A1 | 1/2011 |
| DE | 102009028278 A1 | 2/2011 |
| DE | 102011052846 A1 | 5/2012 |
| EP | 0068974 A1 | 1/1983 |
| EP | 0178202 A1 | 4/1986 |
| EP | 0198496 A1 | 10/1986 |
| EP | 0208900 A2 | 1/1987 |
| EP | 0370552 A1 | 5/1990 |
| EP | 0374616 A1 | 6/1990 |
| EP | 0383028 A2 | 8/1990 |
| EP | 0405627 A1 | 1/1991 |
| EP | 437189 A1 | 7/1991 |
| EP | 0454640 A1 | 10/1991 |
| EP | 0521815 A1 | 1/1993 |
| EP | 0585905 A2 | 9/1993 |
| EP | 0702928 A1 | 8/1995 |
| EP | 0597907 B1 | 12/1995 |
| EP | 0725182 A1 | 8/1996 |
| EP | 0748607 A2 | 12/1996 |
| EP | 0752231 A1 | 1/1997 |
| EP | 752231 A1 | 1/1997 |
| EP | 0854311 A2 | 7/1998 |
| EP | 0855165 A2 | 8/1998 |
| EP | 0898928 A1 | 3/1999 |
| EP | 1029965 A1 | 8/2000 |
| EP | 1224902 A2 | 7/2002 |
| EP | 1256308 A2 | 11/2002 |
| EP | 1264570 | 12/2002 |
| EP | 1319360 A1 | 6/2003 |
| EP | 1342827 | 9/2003 |
| EP | 1346680 A2 | 9/2003 |
| EP | 1386575 A1 | 2/2004 |
| EP | 1415587 | 5/2004 |
| EP | 1498065 A1 | 1/2005 |
| EP | 1583455 A1 | 10/2005 |
| EP | 1703834 A1 | 9/2006 |
| EP | 1743871 A1 | 1/2007 |
| EP | 1862104 A1 | 12/2007 |
| EP | 1882436 A1 | 1/2008 |
| EP | 1980193 A1 | 10/2008 |
| EP | 2127587 A1 | 2/2009 |
| EP | 2075366 A1 | 7/2009 |
| EP | 2138087 A1 | 12/2009 |
| EP | 2332457 A1 | 6/2011 |
| FR | 1370521 A | 8/1964 |
| FR | 2372363 A1 | 6/1978 |
| FR | 2491320 A1 | 4/1982 |
| FR | 2491321 A1 | 4/1982 |
| FR | 2790013 A1 | 8/2000 |
| GB | 973859 A | 10/1964 |
| GB | 1047948 | 11/1966 |
| GB | 1123789 A | 8/1968 |
| GB | 1515095 | 6/1978 |
| GB | 2274772 A | 8/1994 |
| JP | 55039215 A | 3/1980 |
| JP | 60069375 A | 4/1985 |
| JP | 61085991 A | 5/1986 |
| JP | 61200824 A | 9/1986 |
| JP | 1005521 A1 | 1/1989 |
| JP | 1080331 A | 3/1989 |
| JP | 5245094 A | 9/1993 |
| JP | 07178030 | 7/1995 |
| JP | 10109007 A | 4/1998 |
| JP | 2000107114 A | 4/2000 |
| JP | 2001190479 A | 7/2001 |
| JP | 2001190480 A | 7/2001 |
| JP | 2003336909 A | 12/2003 |
| JP | 2003339607 A | 12/2003 |
| JP | 2004267507 A | 9/2004 |
| JP | 2005124979 A | 5/2005 |
| JP | 2006075635 A | 3/2006 |
| JP | 2007068601 A | 3/2007 |
| JP | 2008093196 A | 4/2008 |
| JP | 2008253543 A | 10/2008 |
| JP | 2008264018 A | 11/2008 |
| JP | 2008264724 A | 11/2008 |
| JP | 2010035745 A | 2/2010 |
| JP | 2010187796 A | 9/2010 |
| KR | 20010077128 | 8/2001 |
| KR | 20090006659 | 1/2009 |
| WO | 2005058124 A1 | 6/2005 |
| WO | 2005115216 A1 | 12/2005 |
| WO | 2007074024 A1 | 7/2007 |
| WO | 2008067898 A1 | 6/2008 |
| WO | 2008125482 | 10/2008 |
| WO | 2009018903 A1 | 2/2009 |
| WO | 2009065696 A1 | 5/2009 |
| WO | 2009077266 A1 | 6/2009 |
| WO | 2009077279 A1 | 6/2009 |
| WO | 2009077280 A1 | 6/2009 |
| WO | 2009077283 A1 | 6/2009 |
| WO | 2009077286 A1 | 6/2009 |
| WO | 2009077290 A1 | 6/2009 |
| WO | 2009118308 A1 | 10/2009 |

OTHER PUBLICATIONS

German Search Report for Counterpart DE102014101260.7, Sep. 18, 2014.
European Search Report for EP11188106, Mar. 29, 2012.
European Search Report for EP12188007, Aug. 6, 2013.
German Search Report for DE102010061347, Jan. 23, 2013.
German Search Report for DE102010061215, Feb. 7, 2013.
German Search Report for DE102010061346, Sep. 30, 2011.
German Search Report for DE102010061343, Jul. 7, 2011.
German Search Report for DE102011053666, Oct. 21, 2011.
German Search Report for DE102013103264, Jul. 12, 2013.
German Search Report for DE102013103625, Jul. 19, 2013.
German Search Report for DE102010061342, Aug. 19, 2011.
European Search Report for EP101952380, May 19, 2011.

ROTATING FILTER FOR A DISHWASHER AND METHODS OF CLEANING A ROTATING FILTER

CROSS-REFERENCE TO RELATED APPLICATION(S)

This application is a divisional of U.S. patent application Ser. No. 13/657,896, filed Oct. 23, 2012, now U.S. Pat. No. 9,554,688 issued Jan. 31, 2017, which is incorporated herein by reference in its entirety.

BACKGROUND OF THE INVENTION

A dishwasher is a domestic appliance into which dishes and other cooking and eating wares (e.g., plates, bowls, glasses, flatware, pots, pans, bowls, etc.) are placed to be washed. The dishwasher may include a filter system to remove soils from liquid circulated onto the dishes.

BRIEF DESCRIPTION OF THE INVENTION

In one embodiment, the invention relates to a dishwasher for treating dishes according to an automatic cycle of operation includes a tub at least partially defining a treating chamber, a sprayer spraying a liquid into the treating chamber, a recirculation circuit fluidly coupling the treating chamber to the spray and recirculating sprayed liquid back to the sprayer for subsequent spraying, a rotating filter located within the recirculation circuit and filtering liquid passing through the recirculation circuit, and a granular agent reservoir in open communication with at least a portion of the rotating filter and storing a granular agent, which contacts the rotating filter to clean the filter during rotation.

In another embodiment, the invention relates to a dishwasher for treating dishes according to an automatic cycle of operation, includes a tub at least partially defining a treating chamber, a sprayer spraying a liquid into the treating chamber, a recirculation circuit fluidly coupling the treating chamber to the spray and recirculating sprayed liquid back to the sprayer for subsequent spraying, a rotating filter located within the recirculation circuit and filtering liquid passing through the recirculation circuit, and a granular agent supply comprising a granular agent configured to be dispensed from the granular agent supply into contact with the rotating filter to effect a cleaning of the rotating filter.

In yet another embodiment, the invention relates to a method of cleaning a rotating filter located within a liquid circuit such that liquid flows through the rotating filter to effect a filtering of the liquid, the method includes passing of liquid through the liquid circuit, rotating the filter during the passing of the liquid, and scouring the rotating filter by introducing a granular agent into the liquid circuit during the passing of the liquid and the rotating of the filter such that the granular agent becomes entrained within the passing liquid and is carried by the passing liquid into contact with the rotating filter.

In another embodiment, the invention relates to a method of cleaning a rotating filter provided within a liquid flow and the filter having an upstream surface and a downstream surface relative to the liquid flow, the method comprising scouring the filter by introducing a granular agent adjacent the upstream surface during at least one of a rotating of the filter and a passing of liquid through the filter from the upstream surface to the downstream surface.

In another embodiment, the invention relates to a method of cleaning a rotating filter provided within a liquid recirculation circuit of a dishwasher, with a flow diverter spaced from the filter to define a gap between the diverter and the filter, the method comprising introducing a granular agent into the gap and while at least some of the granular agent resides within the gap, rotating of the filter or passing liquid through the filter to effect a cleaning of the filter with the granular agent.

DESCRIPTION OF EMBODIMENTS OF THE INVENTION

Figure 1:
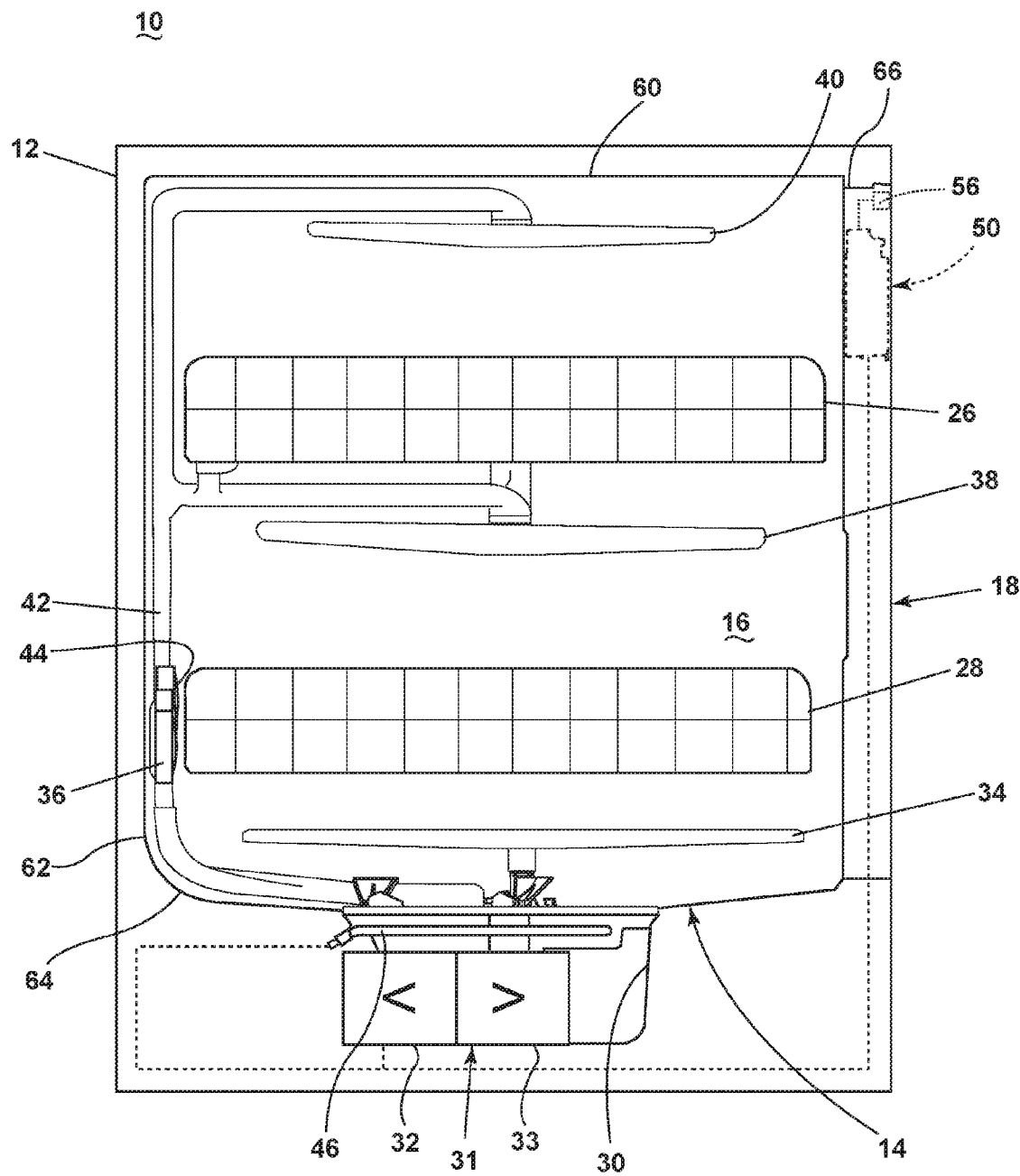
FIG. 1 is a schematic, cross-sectional view of a dishwasher according to a first embodiment of the invention.

In FIG. 1, an automated dishwasher 10 according to a first embodiment is illustrated. The dishwasher 10 shares many features of a conventional automated dishwasher, which will not be described in detail herein except as necessary for a complete understanding of the invention. A chassis 12 may define an interior of the dishwasher 10 and may include a frame, with or without panels mounted to the frame. An open-faced tub 14 may be provided within the chassis 12 and may at least partially define a treating chamber 16, having an open face, for washing dishes. A door assembly 18 may be movably mounted to the dishwasher 10 for movement between opened and closed positions to selectively open and close the open face of the tub 14. Thus, the door assembly provides accessibility to the treating chamber 16 for the loading and unloading of dishes or other washable items.

It should be appreciated that the door assembly 18 may be secured to the lower front edge of the chassis 12 or to the lower front edge of the tub 14 via a hinge assembly (not shown) configured to pivot the door assembly 18. When the door assembly 18 is closed, user access to the treating chamber 16 may be prevented, whereas user access to the treating chamber 16 may be permitted when the door assembly 18 is open.

Dish holders, illustrated in the form of upper and lower dish racks 26, 28, are located within the treating chamber 16 and receive dishes for washing. The upper and lower racks 26, 28 are typically mounted for slidable movement in and out of the treating chamber 16 for ease of loading and unloading. Other dish holders may be provided, such as a silverware basket. As used in this description, the term "dish(es)" is intended to be generic to any item, single or plural, that may be treated in the dishwasher 10, including, without limitation, dishes, plates, pots, bowls, pans, glassware, and silverware.

A spray system is provided for spraying liquid in the treating chamber 16 and includes sprayers provided in the form of a first lower spray assembly 34, a second lower spray assembly 36, a rotating mid-level spray arm assembly 38, and/or an upper spray arm assembly 40, which are proximate to the tub 14 to spray liquid into the treating chamber 16. Upper spray arm assembly 40, mid-level spray arm assembly 38 and lower spray assembly 34 are located, respectively, above the upper rack 26, beneath the upper rack 26, and beneath the lower rack 24 and are illustrated as rotating spray arms. The second lower spray assembly 36 is illustrated as being located adjacent the lower dish rack 28 toward the rear of the treating chamber 16. The second lower spray assembly 36 is illustrated as including a vertically oriented distribution header or spray manifold 44.

A recirculation circuit is provided for recirculating liquid from the treating chamber 16 to the spray system and recirculating the sprayed liquid back to the spray system for subsequent spraying. The recirculation circuit may include a sump 30 and a pump assembly 31. The sump 30 collects the liquid sprayed in the treating chamber 16 and may be formed by a sloped or recessed portion of a bottom wall of the tub 14. The pump assembly 31 may include both a drain pump assembly 32 and a recirculation pump assembly 33. The drain pump assembly 32 may draw liquid from the sump 30 and pump the liquid out of the dishwasher 10 to a household drain line (not shown). The recirculation pump assembly 33 may be fluidly coupled between the treating chamber 16 and the spray system to define a circulation circuit for circulating the sprayed liquid. More specifically, the recirculation pump assembly 33 may draw liquid from the sump 30 and the liquid may be simultaneously or selectively pumped through a supply tube 42 to each of the assemblies 34, 36, 38, 40 for selective spraying. While not shown, a liquid supply system may include a water supply conduit coupled with a household water supply for supplying water to the treating chamber 16.

A heating system including a heater 46 may be located within the sump 30 for heating the liquid contained in the sump 30.

A controller 50 may also be included in the dishwasher 10, which may be operably coupled with various components of the dishwasher 10 to implement a cycle of operation. The controller 50 may be located within the door 18 as illustrated, or it may alternatively be located somewhere within the chassis 12. The controller 50 may also be operably coupled with a control panel or user interface 56 for receiving user-selected inputs and communicating information to the user. The user interface 56 may include operational controls such as dials, lights, switches, and displays enabling a user to input commands, such as a cycle of operation, to the controller 50 and receive information.

Figure 2:
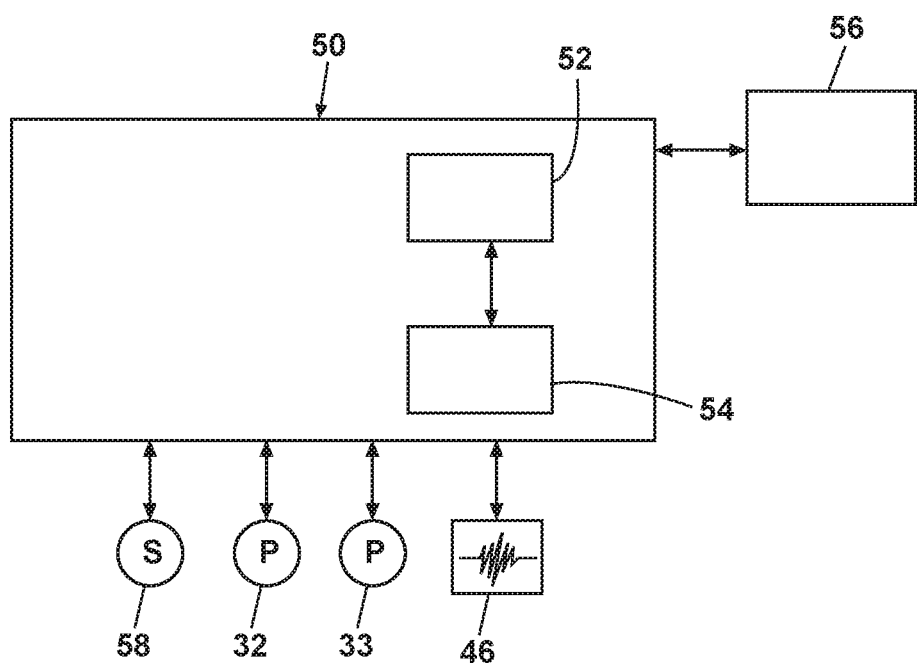
FIG. 2 is a schematic view of a controller of the dishwasher of FIG. 1.

As illustrated schematically in FIG. 2, the controller 50 may be coupled with the heater 46 for heating the wash liquid during a cycle of operation, the drain pump assembly 32 for draining liquid from the treating chamber 16, and the recirculation pump assembly 33 for recirculating the wash liquid during the cycle of operation. The controller 50 may be provided with a memory 52 and a central processing unit (CPU) 54. The memory 52 may be used for storing control software that may be executed by the CPU 54 in completing a cycle of operation using the dishwasher 10 and any additional software. For example, the memory 52 may store one or more pre-programmed cycles of operation that may be selected by a user and completed by the dishwasher 10. The controller 50 may also receive input from one or more sensors 58. Non-limiting examples of sensors that may be communicably coupled with the controller 50 include a temperature sensor and turbidity sensor to determine the soil load associated with a selected grouping of dishes, such as the dishes associated with a particular area of the treating chamber. Further, any variety of filter clogging sensors, which may be used for determining a degree of clogging may be included. By way of example, a pressure sensor that may be capable of providing an output indicative of the pressure of the liquid output by the recirculation pump assembly 33 may be used as a filter clogging sensor.

Figure 3:
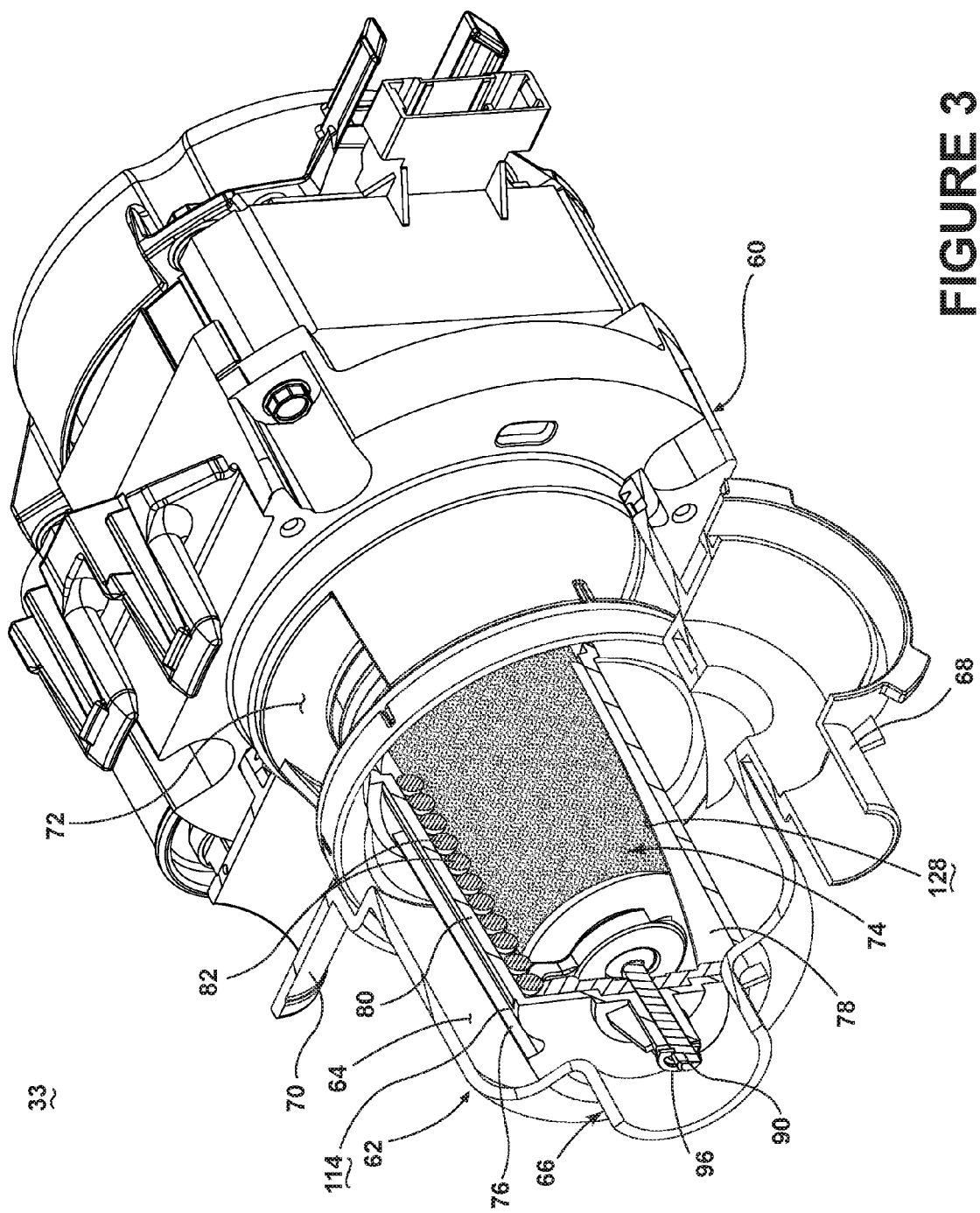
FIG. 3 is a perspective view of an embodiment of a pump and filter assembly of the dishwasher of FIG. 1 with portions cut away for clarity.

Referring now to FIG. 3, the recirculation pump assembly 33 is shown removed from the dishwasher 10. The recirculation pump assembly 33 includes a recirculation pump 60 that is secured to a housing 62, which is shown partially cutaway for clarity. The housing 62 defines a filter chamber 64 that extends the length of the housing 62 and includes an inlet port 66, a drain outlet port 68, and a recirculation outlet port 70. The inlet port 66 is configured to be coupled to a fluid hose extending from the sump 30. The filter chamber 64, depending on the location of the recirculation pump assembly 33, may functionally be part of the sump 30 or replace the sump 30. The drain outlet port 68 for the recirculation pump 60, which may also be considered the drain pump inlet port, may be coupled to the drain pump assembly 32 such that actuation of the drain pump assembly 32 drains the liquid and any foreign objects within the filter chamber 64. The recirculation outlet port 70 is configured to receive a fluid hose such that the recirculation outlet port 70 may be fluidly coupled to the liquid spraying system including the assemblies 34, 36, 38, 40. The recirculation outlet port 70 is fluidly coupled to an impeller chamber 72 of the recirculation pump 60 such that when the recirculation pump 60 is operated liquid may be supplied to each of the assemblies 34, 36, 38, 40 for selective spraying. In this manner, the recirculation pump 60 includes an inlet fluidly coupled to the tub 14 and an outlet fluidly coupled to the liquid spraying system to recirculate liquid from the tub 14 to the treating chamber 16.

Figure 4:
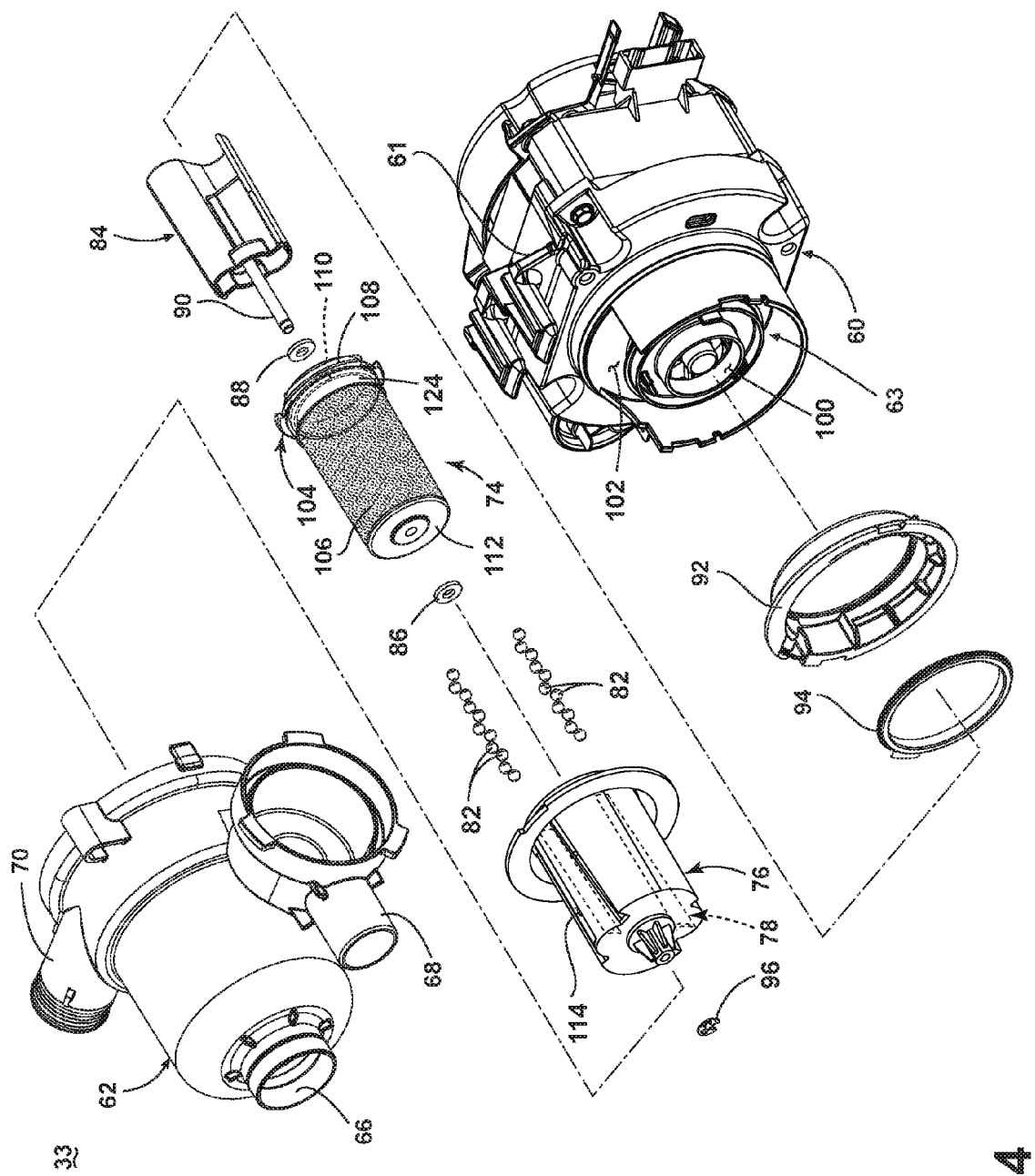
FIG. 4 is an exploded view of the pump and filter assembly of FIG. 3.

A liquid filtering system may be included within the recirculation pump assembly 33 and is illustrated as including a rotating filter 74 and a shroud 76 having a first diverter 78 and a granular agent reservoir 80 containing a granular agent 82. The rotating filter 74 may be located exteriorly of the tub 14 and may be located within the recirculation circuit such that it may filter liquid passing through the recirculation circuit. FIG. 4 more clearly illustrates that the recirculation pump assembly 33 may also include a second diverter 84, a first bearing 86, a second bearing 88, a shaft 90, a separator ring 92, a floating ring 94, and a clip 96.

The recirculation pump assembly 33 may also include a recirculation pump 60 having a motor 61 and an impeller 63, which may be rotatably driven by the motor 61. The recirculation pump 60 includes an inlet 100 and an outlet 102, both of which are in fluid communication with the circulation circuit. The inlet 100 of the recirculation pump 60 may have an area of 660 to 810 $mm^2$ and the outlet 102 of the recirculation pump 60 may have an area of 450 to 500 $mm^2$. The recirculation pump 60 may also have an exemplary volumetric flow rate and the rate may be in the range of 15 liters per minute to 32 liters per minute. The motor 61 may be a variable speed motor having speeds ranging from between 2000 and 3500 rpm. Alternatively, the motor 61 may include a single speed motor having any suitable speed; for example, the motor 61 may have a speed of 3370 rpm+/−50 rpm. The rotating filter 74 may be operably coupled to the impeller 63 such that rotation of the impeller 63 effects the rotation of the rotating filter 74.

The rotating filter 74 may include a hollow body formed by a frame 104 and a screen 106 and may have an exterior and an interior. The hollow body of the rotating filter 74 may be any suitable shape including that of a cone or a cylinder. Alternatively, the rotating filter 74 may be disk shaped. The frame 104 is illustrated as including a first ring 108, a second ring 110, and an end portion 112. The screen 106 is supported by the frame 104 and the position of the screen 106 may be fixed relative to the frame 104. In the illustrated embodiment, the screen 106 is held between the first and second rings 108 and 110 of the frame 104.

The screen 106 may include a plurality of perforations through which liquid may pass. The plurality of perforations may have a variety of sizes and spacing including that the screen 106 may leave a more non-perforated area to give the screen 106 greater hoop strength. It is also contemplated that the perforations may be arranged to leave non-perforated bands encircling the screen 106 with the non-perforated bands functioning as strengthening ribs.

The shroud 76 may define an interior and may be sized to at least partially enclose the rotating filter 74. The shroud 76 may be fluidly accessible through multiple access openings 114. It is contemplated that the shroud 76 may include any number of access openings 114 including a singular access opening 114. The first diverter 78 may be integrated with the shroud 76 and may be sized to extend along at least a portion of the rotating filter 74. Alternatively, the first diverter may be separate from the shroud 76 and may be located within the access opening 114.

Figure 5:
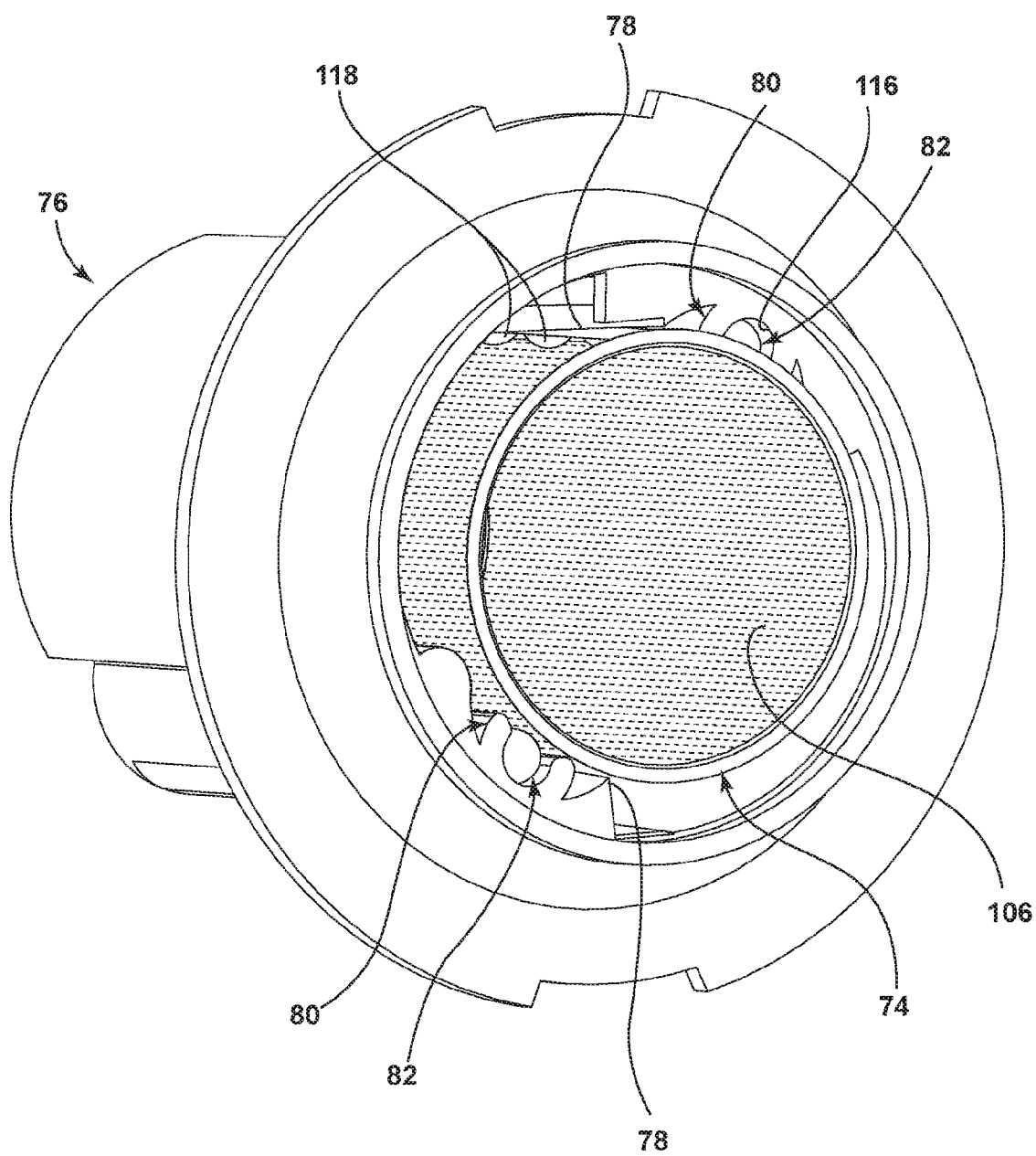
FIG. 5 is a perspective view of a portion of the filter assembly of FIG. 3.

As may more clearly be seen in FIG. 5, the granular agent reservoir 80 is in open communication with at least a portion of the rotating filter 74. The granular agent 82 is stored therein and may contact the rotating filter 74 to clean the rotating filter 74 during rotation. In the illustrated embodiment the granular agent reservoir 80 includes a channel 116 and the granular agent 82 is located within the channel 116. The channel 116 is located such that it is parallel to a surface of the screen 106. The granular agent 82 has been illustrated as including a number of beads 118. It is contemplated that any number of beads 118 may be included in the channel 116 including a singular bead 118. The beads 118 have been illustrated as being spherical although the particles making up the granular agent 82 need not be so. The beads 118 may move back and forth within the channel 116 and may bounce off the filter screen 106 while being retained within the channel 116. The beads 118 may be formed from any suitable material including a hard plastic or a softer silicone. Further, the beads may be formed from multiple materials including having a hard core with a silicone coating.

Figure 6:
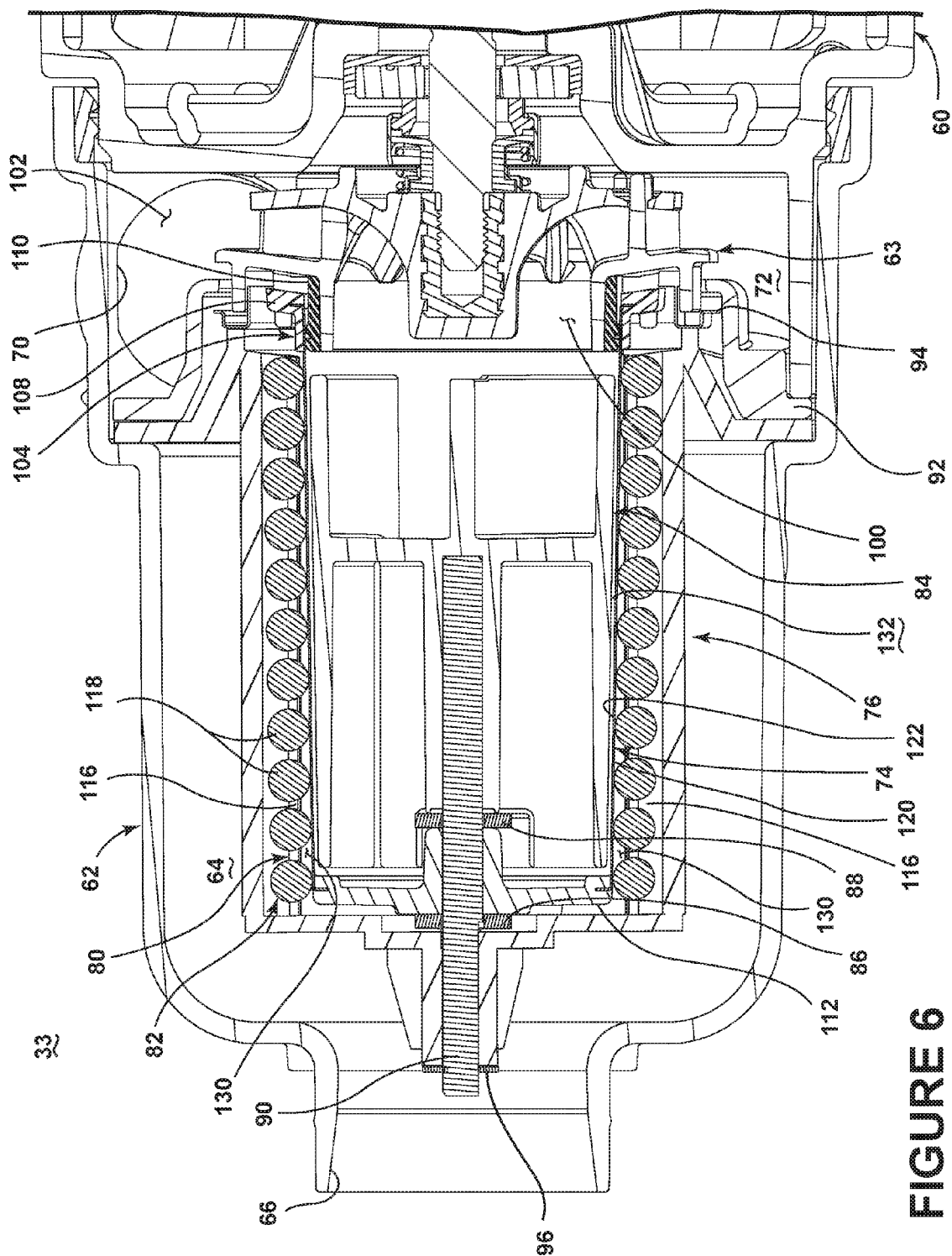
FIG. 6 is a cross-sectional view of the pump and filter assembly of FIG. 3.

As shown in FIG. 6 when assembled, the first bearing 86 may be mounted in an end of the rotating filter 74 and may receive the stationary shaft 90, which in turn may be mounted to an end of the shroud 76 through a retainer, such as the spring clip 96. The clip 96 may retain the shroud 76 on the stationary shaft 90 such that it does not slide or rotate. In such a position the first diverter 78 and granular agent reservoir 80 may be located adjacent the rotating filter 74. The second bearing 88 may be adjacent an inside portion of the rotating filter 74 and may receive the stationary shaft 90.

The second bearing 88 may also separate the rotating filter 74 from the second diverter 84, which may also be mounted on the stationary shaft 90. In this way, the rotating filter 74 may be rotatably mounted to the stationary shaft 90 with the first bearing 86 and the second bearing 88 and the shroud 76 and the second diverter 84 may be stationary with the shaft 90.

The shroud 76 may be mounted at its other end to the separator ring 92. The separator ring 92 acts to separate the filtered water in the impeller chamber 72 from the mixture of liquid and soils in the filter chamber 64. The separator ring 92 may be located between the floating ring 94 and the recirculation pump 60. The floating ring 94 may be axially moveable to aid in radially and vertically sealing with the separator ring 92.

The screen 106 may have a first surface 120 defining an upstream surface and a second surface 122 defining a downstream surface. The rotating filter 74 may be located within the circulation circuit such that the circulated liquid passes through the rotating filter 74 from the upstream surface defined by the first surface 120 to a downstream surface defined by the second surface 122. In this manner, recirculating liquid passes through the rotating filter 74 from the upstream surface to the downstream surface to effect a filtering of the liquid. In the described flow direction, the upstream surface correlates to the outer of first surface 120 of the rotating filter 74 and the downstream surface correlates to the inner or second surface 122 of the rotating filter 74 such that the rotating filter 74 separates the upstream portion of the filter chamber 64 from the outlet port 70. If the flow direction is reversed, the downstream surface may correlate with the outer or first surface 120 and the upstream surface may correlate with the inner or second surface 122.

The first diverter 78 may extend along and be spaced away from at least a portion of the upstream surface to define a gap 128 (FIG. 3) between the first diverter 78 and the rotating filter 74 with a first portion of the first diverter 78 being proximate the impeller 63 and the second portion of the first diverter 78 being distal the impeller 63. Similarly, the granular agent reservoir 80 is also spaced from the rotating filter 74 to define a gap 130 between the granular agent reservoir 80 and the rotating filter 74. The beads 118 may bounce around within the channel 116 and when they are located at the opening of the channel 116 may extend into the gap 130 and contact the rotating filter 74. In the illustrated example, the beads 118 have been illustrated in multiple locations around the rotating filter 74. It is contemplated that such beads 118 may be used at any number of locations.

Alternatively, the beads 118 may be held within certain portions of the channel 116 and released to move within the channel 116 if it is determined that the filter is clogged. For example, in the instance where the beads 118 are magnetic, they may be held towards a back portion of the channel 116 by an electro-magnet and released so that they may extend into the gap 130 when it has been determined that the filter is clogged. The magnetic particles may then be gathered again at the back of the channel 116 by activating the electro-magnet once it is determined that the filter is no longer clogged.

The rotating filter 74 and the shroud 76 may be arranged such that the first diverter 78 and the channel 116 are spaced from the screen 106 to form the gap 128 and the gap 130. While the dimensions may vary depending on the implementation, as illustrated, the gap 128 may be in a range of 0.25 mm to 1 mm and is preferably around 0.5 mm. The gap 130 may be slightly larger and may be sized away from the screen 106 according to the size of the beads 118. In the illustrated embodiment, the internal or second diverter 84 may be proximate the downstream surface to define a second gap 132. The gap 132 may be in a range of 0.5 mm to 2 mm and is preferably around 0.75 mm. Thus, the first diverter 78 may be proximate the exterior of the rotating filter 74 and the second diverter 84 may be proximate the interior of the rotating filter 74.

In operation, wash liquid, such as water and/or treating chemistry (i.e., water and/or detergents, enzymes, surfactants, and other cleaning or conditioning chemistry), enters the tub 14 and flows into the sump 30 to the inlet port 66 where the liquid may enter the filter chamber 64. As the filter chamber 64 fills, liquid passes through the perforations in the rotating filter 74. After the filter chamber 64 is completely filled and the sump 30 is partially filled with liquid, the dishwasher 10 activates the motor 61. During an operation cycle, a mixture of liquid and foreign objects such as soil particles may advance from the sump 30 into the filter chamber 64 to fill the filter chamber 64.

Activation of the motor 61 causes the impeller 63 and the rotating filter 74 to rotate. The liquid in the recirculation flow path flows into the filter chamber 64 from the inlet port 66. The rotation of the filter 74 causes the liquid and soils therein to rotate in the same direction within the filter chamber 64. The recirculation flow path may circumscribe at least a portion of the shroud 76 and enters through access openings 114 therein. The rotation of the impeller 63 draws liquid from the filter chamber 64 and forces the liquid by rotation of the impeller 63 outward such that it is advanced out of the impeller chamber 72 through the recirculation outlet port 70 to the assemblies 34, 36, 38, 40 for selective spraying. When liquid is delivered to the assemblies 34, 36, 38, 40, it is expelled from the assemblies 34, 36, 38, 40 onto any dishes positioned in the treating chamber 16. Liquid removes soil particles located on the dishes, and the mixture of liquid and soil particles falls onto the bottom wall of the tub 14. The sloped configuration of the bottom wall of the tub 14 directs that mixture into the sump 30. The recirculation pump 60 is fluidly coupled downstream of the downstream surface of the rotating filter 74 and if the recirculation pump 60 is shut off then any liquid and soils within the filter chamber will settle in the filter chamber 64 where the liquid and any soils may be subsequently drained by the drain pump assembly 32.

Figure 7:
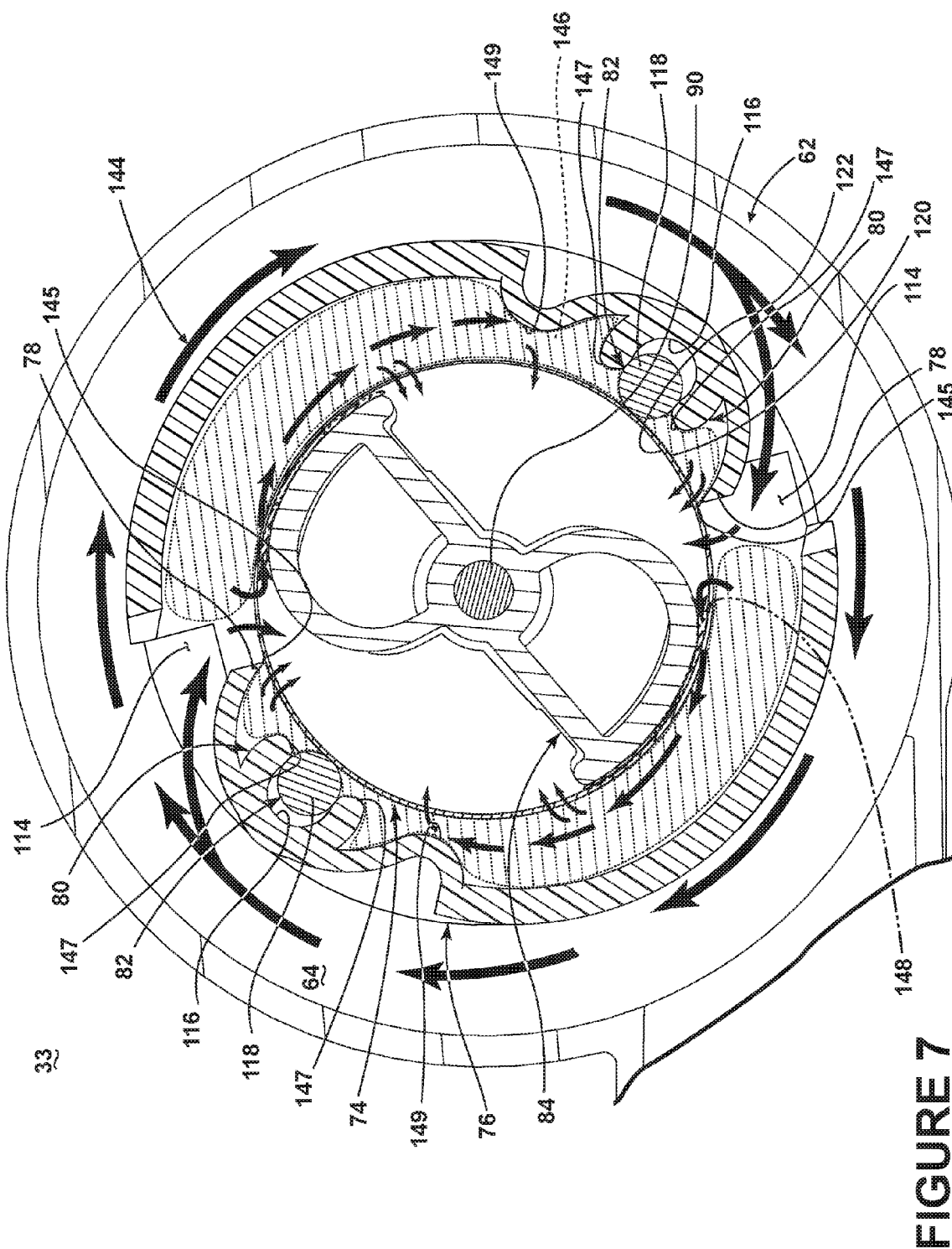
FIG. 7 is a cross-sectional elevation view of a portion of the pump and filter assembly of FIG. 3.

FIG. 7 illustrates more clearly the shroud 76, first diverter 78, channel 116, beads 118, the second diverter 84, and the flow of the liquid along the recirculation flow path. Multiple arrows 144 illustrate the travel of liquid along the recirculation flow path as it passes through the rotating filter 74 from the upstream surface defined by the first surface 120 to a downstream surface defined by the second surface 122. The rotation of the filter 74, which is illustrated in the clockwise direction, causes the liquid and soils therein to rotate in the same direction within the filter chamber 64. The recirculation flow path is thus illustrated as circumscribing at least a portion of the shroud 76 and as entering through the access openings 114. In this manner, the multiple access openings 114 may be thought of as facing downstream to the recirculation flow path. It is possible that some of the liquid in the recirculation flow path may make one or more complete trips around the shroud 76 prior to entering the access openings 114. The number of trips is somewhat dependent upon the suction provided by the recirculation pump 60 and the rotation of the filter 74. As may be seen, a small portion of the liquid may be drawn around the shroud 76 and into the access opening 114 in a direction opposite that of the rotation of the filter 74. The shape of the shroud 76, the first diverter 78, and the second diverter 84 as well as the suction from the recirculation pump 60 may result in a portion of the liquid turning in this manner, which helps discourage foreign objects from entering the access opening 114 as they are less able to make the same turn around the shroud 76 and into the access opening 114.

Several of the zones created in the filter chamber 64 during operation have also been illustrated and include: a first shear force zone 146 and a second shear force zone 148. These zones impact the travel of the liquid along the liquid recirculation flow path. It will be understood that the shroud 76, the first diverter 78, and portions of the channel 116 form artificial boundaries spaced from the upstream surface defined by the first surface 120 of the rotating filter 74 such that liquid passing between the shroud 76, the first diverter 78, and the channel 116 and the upstream surface applies a greater shear force on the first surface 120 than liquid in an absence of the shroud 76, the first diverter 78, and the channel 116 and that in this manner the first shear force zone 146 is formed. While the shroud 76, the first diverter 78, and the channel 116 form the first shear force zone 146 it will be understood that the leading edge 145 of the first diverter 78, the edges 147 of the channel 116, and the protrusion 149 may locally generate the greatest shear forces. More specifically, the angular velocity of the liquid at each of these points may increase relative to its previous velocity. As each of the leading edge 145, the edges 147, and the protrusion 149 are stationary, the liquid in direct contact with each is also stationary or has no rotational speed. The liquid in direct contact with the rotating filter 74 has the same angular speed as the rotating filter 74, which is generally in the range of 3000 rpm and may vary between 2000 to 3500 rpm. The speed of rotation is not limiting to the invention. Thus, the liquid between these points and the first surface 120 of the rotating filter 74 has an angular speed profile of zero where it is constrained at the leading edge 145, the edges 147, and the protrusion 149 to approximately 3000 rpm where it contacts the rotating filter 74. This requires substantial angular acceleration, which locally generates a shear force acting on the first surface 120 of the rotating filter 74. Thus, the proximity of the leading edge 145, the edges 147, and the protrusion 149 to the rotating filter 74 causes an increase in the angular velocity of the liquid and results in a greater shear force being applied to the first surface 120 of the rotating filter 74.

Similarly, the second diverter 84 forms a second artificial boundary spaced from the downstream surface defined by the second surface 122 of the rotating filter 74 and creates the second shear force zone 148. The first and second shear force zones 146 and 148 aid in removing foreign soil from the rotating filter 74. Additional zones, including backflow zones where liquid is pushed from the downstream side of the rotating filter 74 to the upstream side, may be formed by the shroud 76, the first diverter 78, and the second diverter 84. For example, as the leading edge 145 extends towards the first surface 120, the distance between the first diverter 78 and the first surface 120 decreases. This decrease in distance between the diverter 78 and the first surface 120 occurs in a direction along a rotational direction of the filter 74 and forms a constriction point at the leading edge 145. After which, in a direction along the rotational direction of the filter 74 no structure opposes the rotating filter 74. A high pressure zone may be formed by the decrease in the gap between the leading edge 145 and the rotating filter 74, which functions to create a localized and increasing pressure gradient up to the leading edge 145, beyond which the liquid is free to expand to form a low pressure, expansion zone. A liquid expansion zone may also be created after the protrusion 149. Such liquid expansion zones may allow liquid to backflow from the second surface 122 to the first surface 120. It is contemplated that the relative orientation between the first diverter 78 and the second diverter 84 may be changed to create variations in the zones formed. Furthermore, the filter 74 may rotate in the counter-clockwise direction. In such an instance, either or both the first diverter 78 and the second diverter 84 may be oriented differently to create variations in the movement of the water.

Furthermore, the relative rotation of the rotating filter 74 to the granular agent reservoir 80 and the beads 118 generates physical contact between the beads 118 and the rotating filter 74. Such contact aids in the removal of soils from the rotating filter 74. In this manner, the beads 118 scour the upstream surface of the rotating filter 74 and provide a mechanical cleaning action.

Figure 8:
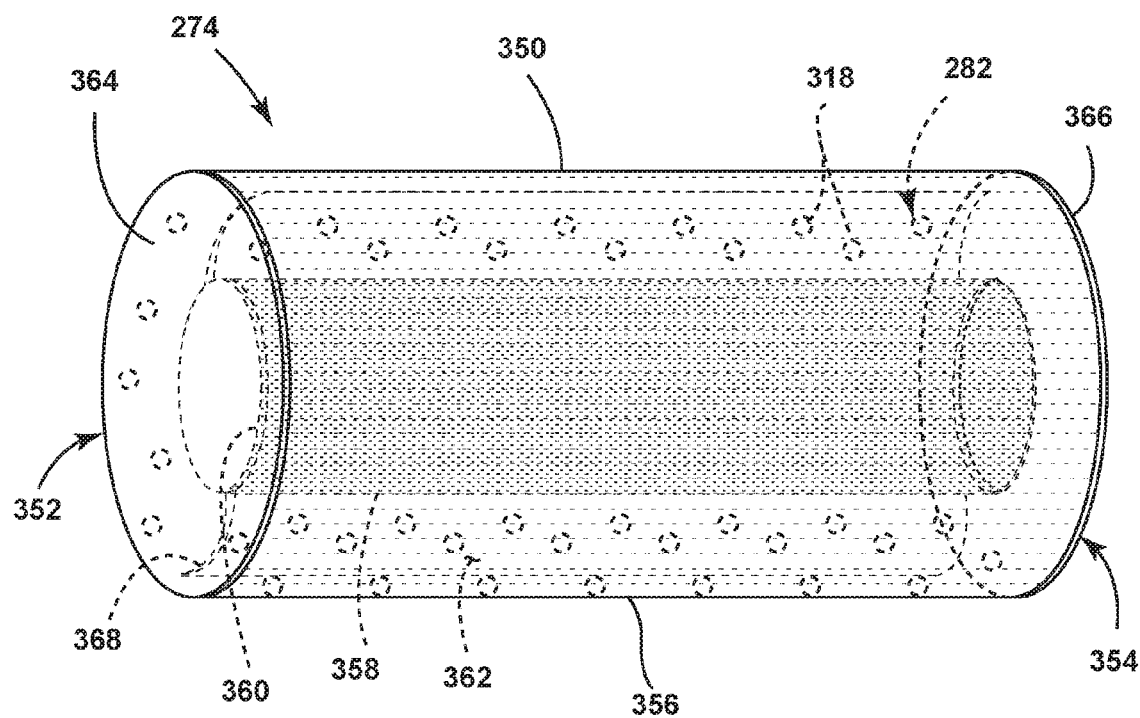
FIG. 8 is a perspective view of a rotating filter that may be used with the dishwasher of FIG. 1 according to a second embodiment of the invention.

FIG. 8 illustrates another embodiment of a rotating filter 274 that may be used in the dishwasher 10. The embodiment illustrated in FIG. 8 is similar to the embodiment in FIG. 3; therefore, like parts will be identified with like numerals increased by 200, with it being understood that the description of the like parts applies to the embodiment in FIG. 8, unless otherwise noted.

One difference is that the rotating filter 274 includes a first filter element 350 extending between a first end 352 and a second end 354 and forming an outer or upstream surface 356 and a second filter element 358 forming an inner or downstream surface 360 and located in the recirculation flow path such that the recirculation flow path passes through the rotating filter 274 from the upstream surface 356 to the downstream surface 360 to effect a filtering of the sprayed liquid. The first filter element 350 and the second filter element 358 are spaced apart from each other to form a gap 362. The first and second filter elements 350 and 358 may be space from each other at the first end 352 by a first end piece 364 and may be spaced from each other at the second end 354 by a second end piece 366. The first end piece 364 has been illustrated as forming a cap on the first end 352 of the rotating filter 274 whereas the second end piece 366 merely joins the first filter element 350 and the second filter element 358. In this manner, the first filter element 350 and second filter element 358 are coupled so that they may rotate together. The rotating filter 274 may be designed in any suitable manner including that the gap 362 may remain constant from the first end 352 to the second end 354 or that the gap 362 may vary in size between the first end 352 and the second end 354. By way of non-limiting example, the first filter element 350 has been illustrated as a cylinder and the second filter element 358 has been illustrated as a cylinder received within the first filter element 350. The first and second filter elements 350 and 358 may have alternative shapes including that they make be disk shaped or cone shaped.

The first filter element 350 and second filter element 358 may be structurally different from each other, may be made of different materials, and may have different properties attributable to them. For example, the first filter element 350 may be a courser filter than the second filter element 358. Both the first and second filter elements 350, 358 may be perforated and the perforations of the first filter element 350 may be different from the perforations of the second filter element 358, with the size of the perforations providing the difference in filtering.

It is contemplated that the first filter element 350 may be more resistant to foreign object damage than the second filter element 358. The resistance to foreign object damage may be provided in a variety of different ways. The first filter element 350 may be made from a different or stronger material than the second filter element 358. The first filter element 350 may be made from the same material as the second filter element 358, but having a greater thickness. The distribution of the perforations may also contribute to the first filter element 350 being stronger. The perforations of the first filter element 350 may leave a more non-perforated area for a given surface area than the second filter element 358, which may provide the first filter element 350 with greater strength, especially hoop strength. It is also contemplated that the perforations of the first filter element 350 may be arranged to leave non-perforated bands encircling the first filter element 350, with the non-perforated bands functioning as strengthening ribs.

As illustrated, the particles 318 forming the granular agent 282 may be encased between the first and second filter elements 350, 358 within the gap 362 between the first end piece 364 and the second end piece 366. The perforations in the first filter element 350 and the second filter element 358 may be sized so that particles 318 forming the granular agent 282 may not pass through the perforations. The particles 318 may be free to move anywhere between the first filter element 350 and the second filter element 358. It is also contemplated that various separators 368 may be included within the gap to form various zones or areas between the first filter element 350 and the second filter element 358 that the particles 318 would be segregated in. The formation of such areas may ensure that the particles 318 remain distributed within the gap 362. The separators 368 need not fully span the gap 362 but will be large enough to keep the particles 318 in their respective areas. Further the separators 368 may aid in strengthening the rotating filter 274. During operation, the particles 318 may contact both the first filter element 350 and the second filter element 358 to scour both the downstream surface of the first filter element 350 and the upstream surface of the second filter element 358.

In an alternative embodiment, the first filter element 350 and the second filter element 358 may not be coupled so that one remains stationary while the other is rotating. In such an instance the flow of liquid around and through the first filter element 350 and the second filter element 358 will create turbulence. The turbulence may in turn cause the particles to bounce off the first filter element 350 and the second filter element 358 and break apart soils caught on the first filter element 350 and the second filter element 358 to clean them.

Figure 9:
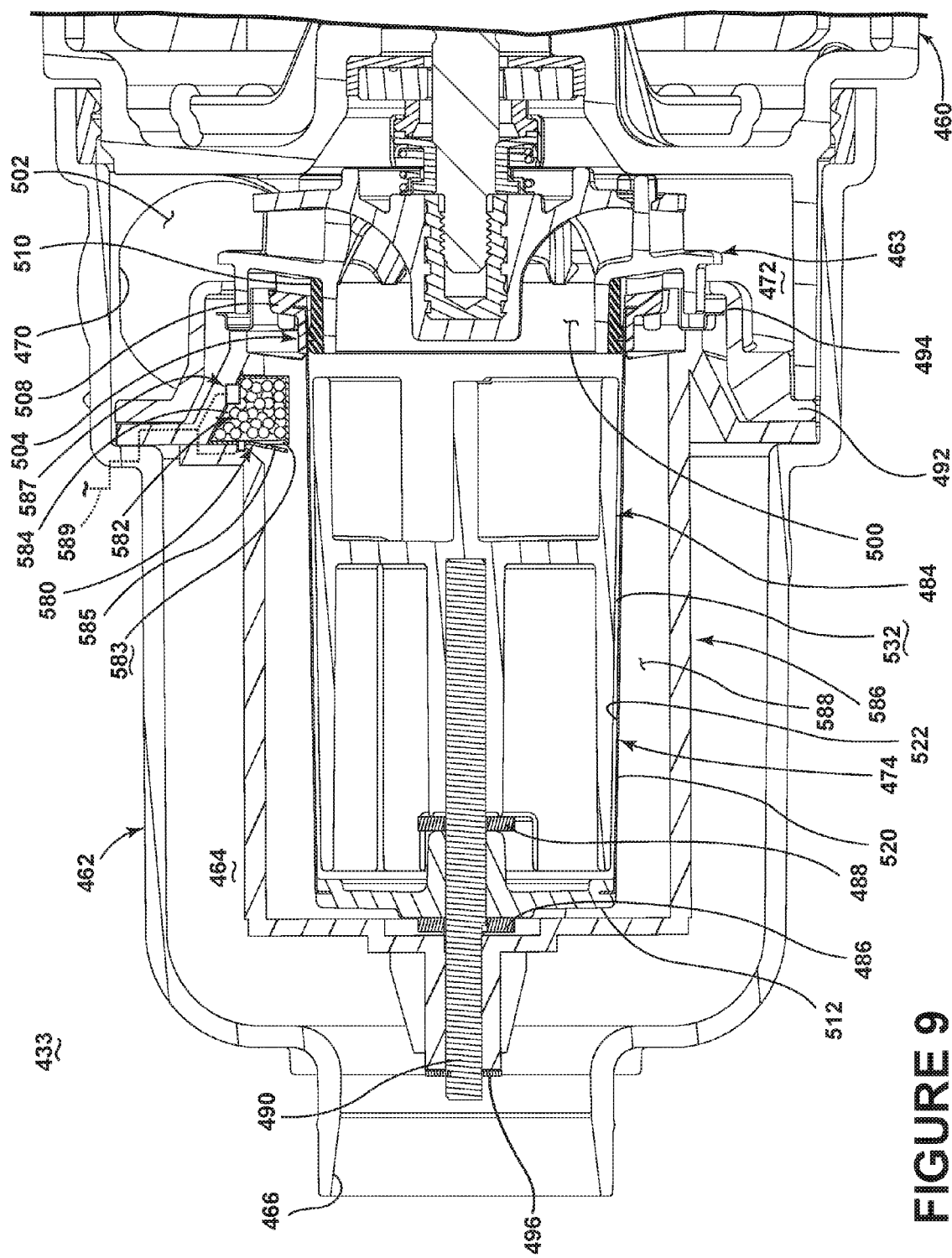
FIG. 9 is a cross-sectional view of a pump and filter assembly that may be used with the dishwasher of FIG. 1 according to a third embodiment of the invention.

FIG. 9 illustrates another embodiment of a recirculation pump assembly 433 that may be used in the dishwasher 10. The embodiment illustrated in FIG. 9 is similar to the embodiment in FIG. 3; therefore, like parts will be identified with like numerals increased by 400, with it being understood that the description of the like parts applies to the embodiment in FIG. 9, unless otherwise noted.

One difference is that the filter assembly includes a granular agent supply 580 that includes a granular agent 582 configured to be dispensed from the granular agent supply 580 into contact with the rotating filter 474 to effect a cleaning of the rotating filter 474. A reservoir 584 for storing the granular agent 582 may be included in the granular agent supply 580. The reservoir 584 may include an outlet 583 that may be used to dispense the granular agent from the reservoir 584. The outlet 583 may be opened and closed by a mechanism 585, such as a door, valve or other suitable mechanism. The reservoir 584 may include at least one of a chamber and a channel with the outlet 583 be located adjacent thereto.

While the size of the granular agent may vary depending on different factors, such as the screen size of the filter and the gap size, as illustrated, the granular agent 582 may include small particles between 0.3 mm and 3.0 mm in diameter. Such particles do not have to be spherical and may be formed from any suitable material. It is contemplated that such particles may be dissolvable or may not be dissolvable. By way of example, such dissolvable particles may be formed from detergent.

By way of further example, a granular agent 582 that is not dissolvable may include magnetic balls. In such an instance, a magnetic field generator 587 may be located relative to the granular agent supply 580 or the reservoir 584 such that one of the activation and deactivation of the magnetic field either releases or captures the magnetic balls. Both the mechanism 585 and the magnetic field generator 587 may be coupled through any suitable connection 589 to the controller 50.

It is contemplated that like the above embodiments a structure 586 may be spaced from the rotating filter 474 to define a gap 588 between the structure 586 and the rotating filter 474. The structure 586 may include a shroud and/or a flow diverter. In such an instance the granular agent supply 580 may be configured to supply the granular agent 582 adjacent the gap 588. In the case where the structure 586 includes a channel, the granular agent supply 580 may be configured to supply the granular agent 582 into the channel. The granular agent supply 580 is illustrated as being configured to supply the granular agent 582 to an upstream side of the rotating filter 474.

It will be understood that while the granular agent supply 580 has been illustrated as being located near the rotating filter 474 it is contemplated that the granular agent supply 580 may alternatively be adjacent another portion of the recirculation circuit and may be configured to supply the granular agent 582 to the upstream surface of the rotating filter 474 by traveling through portions of the recirculation circuit to the upstream surface of the rotating filter 474. In this manner, the granular agent supply 580 may be located in any number of suitable alternative locations. In the case where the granular agent 582 is dissolvable and needs to be resupplied such alternative locations may provide easier access for such resupply.

During operation, when the rotating filter 474 is clogged the granular agent 582 located within the granular agent supply 580 may be allowed to contact the filter 474 to unclog it. The dishwasher 10 may be operated in accordance with a method to automatically scour the filter 474 with the granular agent 582 based on a degree of clogging of the filter 474. More specifically, the dishwasher 10 may be operated to spray liquid from within the treating chamber 16 and the sprayed liquid may be recirculated by the recirculation pump 460 from the treating chamber 16 to at least one of the first lower spray assembly 34, second lower spray assembly 36, rotating mid-level spray arm assembly 38, and/or upper spray arm assembly 40, for subsequent spraying to define a recirculation flow path. The controller 50 may determine a degree of clogging of the filter 474 and may automatically control the granular agent supply 580 based on the degree of clogging of the filter 474.

Determining the degree of clogging of the filter 474 may be done in any suitable manner. For example, the degree of clogging of the filter 474 may include determining a pressure output of the recirculation pump 460. For example, a pressure sensor may be capable of providing an output indicative of the pressure of the liquid output by the recirculation pump 460. Alternative clogging sensors may be used for determining a degree of clogging may include a motor torque sensor, flow meter, etc. While the liquid is being recirculated, the filter 474 may begin to clog with soil particles. This clogging causes the outlet pressure from the recirculation pump 460 to decrease as the clogging of the passages of the filter 474 hinders the movement of the liquid into an inlet of the recirculation pump 460. As the filter 474 clogs the motor torque and motor current decrease.

The signal from the sensor 58 may be monitored by the controller 50 and the controller 50 may determine that when the magnitude of the signal satisfies a predetermined threshold there is a particular degree of clogging of the filter 474. The predetermined threshold for the signal magnitude may be selected in light of the characteristics of any given machine. For the purposes of this description, satisfying a predetermined threshold value means that the parameter, in this case the magnitude of the signal, is compared with a reference value and the comparison indicates the satisfying of the sought after condition, in this case the clogging of the filter 474. Reference values are easily selected or numerically modified such that any typical comparison can be substituted (greater than, less than, equal to, not equal to, etc.). The form of the reference value and the magnitude signal value may also be similarly selected, such as by using an average, a maximum, etc. The controller 50 may also compare the magnitude of the sensor signal to multiple reference values to determine the degree of clogging. The controller 50 may also determine the degree of clogging by determining a change in the monitored signal over time as such a determined change may also be illustrative of a degree of clogging of the filter 474. For example, this may include determining a change in a pressure output of the recirculation pump 460. For purposes of this description, it is only necessary that some form of a sensor signal to be compared to at least one reference value in such a way that a determination can be made about the degree of clogging of the filter 474. Once the controller 50 has determined that a degree of clogging exists, the controller 50 may control the supply of granular agent 582 from the granular agent supply 580. For example, the controller 50 may operate the mechanism 585 to open the outlet 583 such that granular agent 582 may be dispensed therefrom. When the filter 474 is clogged and granular agent 582 is allowed to contact the filter 474 the granular agent 582 scours the filter 474 and breaks up the soils on the surface of the filter 474, allowing it to function again. In the case where a structure is located adjacent the rotating filter 474, both the mechanical action from the granular agent 582 as well as fluid forces created by the structure may be used to clean the filter 474.

It is also contemplated that the granular agent supply 580 may be used with a rotating filter having two filter screens spaced from each other to form a gap. In such an instance the granular agent supply 580 may be configured to supply the granular agent 582 into the gap between the two screens. In one embodiment, separators may be located within the gap to define a first area within the gap and a second area within the gap and the granular agent supply 580 may be configured to selectively supply the granular agent 582 into the first area and the second area. It is contemplated that sensors may be capable of sending information to the controller regarding which area is clogged and that the granular agent 582 may then be supplied to that specific area of the filter. Such a granular agent may be dissolvable within the liquid recirculating through the recirculation circuit.

The above described embodiments may be used to implement one or more embodiments of the invention. More specifically, the embodiments of the method of the invention may be used to clean a rotating filter. It is contemplated that such methods of the invention may be used to clean alternative rotating filters not described above. For ease of explanation the methods will be described with respect to the above embodiments.

Figure 10:
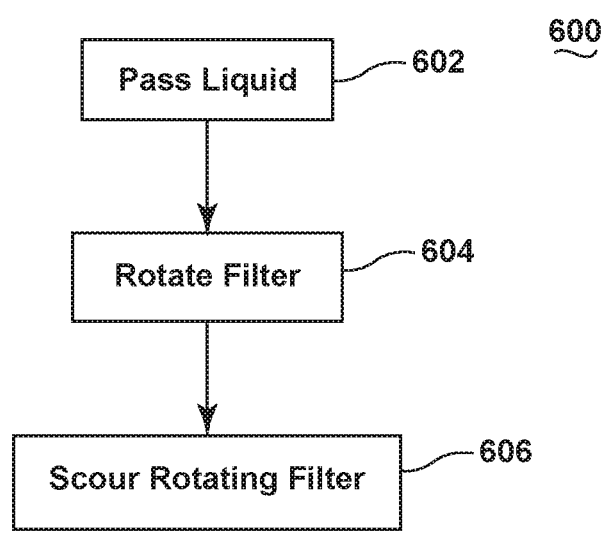
FIG. 10 is a flow chart illustrating one method for cleaning a rotating filter according to a fourth embodiment of the invention.

FIG. 10 is a flow-chart depicting a method 600 of cleaning a rotating filter. The method 600 may be carried out by the controller 50, using information from the sensors 58. The method 600 may be applicable to a rotating filter located within a liquid circuit such that liquid flows through the rotating filter to effect a filtering of the liquid. The sequence of steps depicted is for illustrative purposes only and is not meant to limit the method 600 in any way as it is understood that the steps may proceed in a different logical order, additional or intervening steps may be included, or described steps may be divided into multiple steps, without detracting from the invention.

The method 600 may include passing liquid through the liquid circuit at 602, rotating the filter during the passing of the liquid at 604, and scouring the rotating filter at 606. The rotating filter may be scoured at 606 by introducing a granular agent into the liquid circuit such that the granular agent becomes entrained within the passing liquid and is carried by the passing liquid into contact with the rotating filter.

Where the filter includes an upstream surface and a downstream surface relative to the liquid flow scouring the filter may alternatively include introducing a granular agent adjacent the upstream surface during at least one of rotation of the filter and passing liquid through the filter from the upstream surface to the downstream surface. In this manner, it is contemplated that an alternative method may include either rotation of the filter or passing liquid through the filter or both rotating of the filter and passing liquid through the filter.

In any of the above alternative methods, it is contemplated that the passing of liquid may include recirculating the liquid through the liquid circuit. Including that the liquid may include a dish treatment liquid and may be recirculated through the dish treating chamber. The passing of liquid may include passing liquid against an upstream surface of the filter.

In instances where cleaning the filter includes rotating the filter it is contemplated that rotating the filter may include rotating a filter forming a hollow body such as those illustrated as described above. The filter may be rotated at a speed greater than 2500 rpm. Alternatively, the filter may be formed such that it does not include a hollow body. For example, the filter may include a disk filter that may be rotated within the flow of liquid.

Introducing the granular agent may include introducing the granular agent adjacent an upstream surface of the filter and/or adjacent the downstream surface of the filter. In embodiments having a structure overlying the filter, introducing the granular agent may include introducing the granular agent into the gap between the filter and a structure overlying the filter. In the embodiments where the structure includes a channel, the granular agent may be introduced into the channel. For example, in the instance where a flow diverter is spaced from the filter to define a gap between the diverter and the filter, the method may include introducing a granular agent into the gap and while at least some of the granular agent resides within the gap, rotating the filter or passing liquid through the filter to effect a cleaning of the filter with the granular agent. Introducing the granular agent into the gap may include introducing the granular agent into the liquid recirculation circuit and having the recirculating liquid carry the granular agent to the gap.

The granular agent may have a variety of grain sizes including that at least some of the grains may be greater in size than openings in the filter. It is contemplated that the granular agent may be dissolvable within the liquid. In such an instance after a certain amount of time, at a certain temperature, or after the granular agent has rubbed against the filter, the granular agent may completely dissolve within the liquid or may partially dissolve within the liquid. Any dissolved granular agent may be drained.

Alternatively, the granular agent may not be dissolvable within the liquid. In such an instance it is contemplated that after the granular agent is introduced it may be removed from the liquid circuit. This may be accomplished by draining the liquid from the liquid circuit. After the granular agent is removed it may be stored for later use and reintroduction into the liquid circuit. The granular agent may include any suitable particles including particles between 0.3 mm and 3.0 mm in diameter. The particles may be shaped in any suitable manner and do not have to be spherical.

By way of non-limiting example, the granular agent may include magnetic particles. The magnetic particles may be formed from any suitable magnetic material. It is also contemplated that the magnetic particles may be formed from magnetic material that is surrounded by a softer material, such as a silicon or plastic. Any combinations of such materials may form the magnetic particles so long as they may still be attracted to an electro-magnet. It is contemplated that the magnetic particles may be any suitable shape and may be sized such that they may get to the filter around the diverters in the filter chamber. In such an instance the introduction or removal of the granular agent may be accomplished by applying or removing a magnetic field from the magnetic particles. More specifically, the magnetic particles may be held stationary by an electro-magnet and released when it has been determined that the filter is clogged. The magnetic particles may be sized and shaped such that they may move freely around the filter to clean it. The magnetic particles may then be gathered by activating the electro-magnet before the dishwasher drains such that they may be reused to clean the filter. Alternatively, the magnetic particles may be incased in a channel that is part of the first diverter or shroud and the electro-magnet may hold the magnets against the first diverter or shroud. The magnets may then be released when the dishwasher detects that the filter is clogged and such release would allow the magnetic particles to move within the channel and contact the filter. Further, it is also contemplated that additional granular particles such as powdered detergent or other small particles may be deposited in the sump or within the recirculation circuit. Such additional granular particles may contact the filter surface and aid in breaking up soils and/or fibers that are clogging the filter.

Alternative dishwashers may be used to implement some of the methods described above. For example, in the case where the granular agent is not meant to be reused or continually used it is contemplated that a separate compartment in the dishwasher may be used for introducing such particles. It is contemplated that such a granular agent may dissolve or be broken apart after a couple minutes in the filter chamber. When it is determined that the filter has clogged, the controller may be configured to dispense particles from the compartment. The granular agent may be dispensed into the dishwasher sump or directly into the filter chamber. As such a granular agent is consumed it is contemplated that the granular agent may need to be replaced. For example, a user may need to replace the granular agent within the compartment. Alternatively, it is contemplated that because the filter will not clog often and only a small amount of particles are needed to clean the filter it may be possible that the compartment is filled with enough particles to last the life of the machine.

To the extent not already described, the different features and structures of the various embodiments may be used in combination with each other as desired. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly described.

The embodiments described above provide for a variety of benefits including enhanced filtration such that soil is filtered from the liquid and not re-deposited on dishes and allow for cleaning of the rotating filter throughout the life of the dishwasher and this maximizes the performance of the dishwasher. Thus, such embodiments require less user maintenance than required by typical filtering systems.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A dishwasher for treating dishes according to an automatic cycle of operation, comprising:
    a tub at least partially defining a treating chamber;
    a sprayer spraying a liquid into the treating chamber;
    a recirculation circuit fluidly coupling the treating chamber to the sprayer and recirculating sprayed liquid back to the sprayer for subsequent spraying;
    a rotating filter located within the recirculation circuit and filtering liquid passing through the recirculation circuit; and
    a granular agent reservoir in open communication with at least a portion of the rotating filter and storing a granular agent, which contacts and scours the rotating filter to clean the filter during rotation.

2. The dishwasher of claim 1 wherein the rotating filter is located exteriorly of the tub.

3. The dishwasher of claim 2, wherein the granular agent reservoir is spaced from the rotating filter to define a gap between the granular agent reservoir and the rotating filter.

4. The dishwasher of claim 3 wherein the granular agent reservoir comprises a channel and the granular agent is located within the channel.

5. The dishwasher of claim 4 wherein the granular agent comprises at least one bead.

6. The dishwasher of claim 5 wherein the granular agent reservoir further comprises a flow diverter that increases shear forces acting on a surface of the filter.

7. The dishwasher of claim 6 wherein the granular agent reservoir comprises a shroud enshrouding the filter.

8. The dishwasher of claim 5 wherein relative rotation of the filter to the granular agent reservoir and the at least one bead generates physical contact on the filter to remove soils.

9. The dishwasher of claim 1 wherein the rotating filter comprises two filter elements spaced from each other to form a gap.

10. The dishwasher of claim 9 wherein the granular agent reservoir further comprises a first end piece that spaces the two filter elements from each other at a first end, and a second end piece that spaces the two filter elements from each other at a second end.

11. The dishwasher of claim 10 wherein the granular agent is located within a gap between the first end piece and the second end piece.

12. A dishwasher for treating dishes according to an automatic cycle of operation, comprising:
    a tub at least partially defining a treating chamber;
    a sprayer spraying a liquid into the treating chamber;
    a recirculation circuit fluidly coupling the treating chamber to the sprayer and recirculating sprayed liquid back to the sprayer for subsequent spraying;
    a rotating filter located within the recirculation circuit and filtering liquid passing through the recirculation circuit; and
    a granular agent supply comprising a granular agent configured to be dispensed from the granular agent supply into contact with the rotating filter such that the granular agent cleans the rotating filter by scouring the rotating filter.

13. The dishwasher of claim 12 wherein the rotating filter is located exteriorly of the tub.

14. The dishwasher of claim 13, further comprising a structure spaced from the rotating filter to define a gap between the structure and the rotating filter.

15. The dishwasher of claim 14 wherein the granular agent supply is configured to supply the granular agent adjacent the gap.

16. The dishwasher of claim 15 wherein the structure comprises a channel and the granular agent supply is configured to supply the granular agent into the channel.

17. The dishwasher of claim 16 wherein the granular agent is in the form of magnetic balls.

18. The dishwasher of claim 17, further comprising a magnetic field generator located relative to the channel such that one of activation and deactivation of the magnetic field either releases or captures the magnetic balls.

19. The dishwasher of claim 18 wherein the structure comprises a flow diverter that increases shear forces acting on a surface of the filter.

20. The dishwasher of claim 18 wherein the structure comprises a shroud enshrouding the filter.

21. The dishwasher of claim 12, further comprising a reservoir for storing the granular agent.

22. The dishwasher of claim 21 wherein the reservoir comprises at least one of a chamber and a channel.

23. The dishwasher of claim 21 wherein the granular agent comprises a magnetic granular agent stored in the reservoir.

24. The dishwasher of claim 23, further comprising a magnetic field generator that activates or deactivates a magnetic field to release or capture the magnetic granular agent from or in the reservoir.

25. The dishwasher of claim 12, further comprising a structure spaced from the rotating filter to define a gap between the structure and the rotating filter.

26. The dishwasher of claim 25 wherein the structure comprises a channel and granular agent supply is configured to supply the granular agent into the channel.

27. The dishwasher of claim 26 wherein the structure comprises a flow diverter that increases shear forces acting on a surface of the filter.

28. The dishwasher of claim 26 wherein the structure comprises a shroud enshrouding the filter.

29. The dishwasher of claim 12 wherein the granular agent supply is configured to supply the granular agent to an upstream side of the rotating filter.

30. The dishwasher of claim 29, further comprising a shroud enshrouding the rotating filter and the granular agent supply is configured to supply the granular agent into the shroud.

31. The dishwasher of claim 12 wherein the rotating filter comprises two filter screens spaced from each other to form a gap.

32. The dishwasher of claim 31 wherein the granular agent supply is configured to supply the granular agent into the gap.

33. The dishwasher of claim 31, further comprising separators located within the gap to define a first area within the gap and a second area within the gap.

34. The dishwasher of claim 33 wherein the granular agent supply is configured to selectively supply the granular agent into the first area and the second area.

* * * * *